United States Patent Office 2,999,735
Patented Sept. 12, 1961

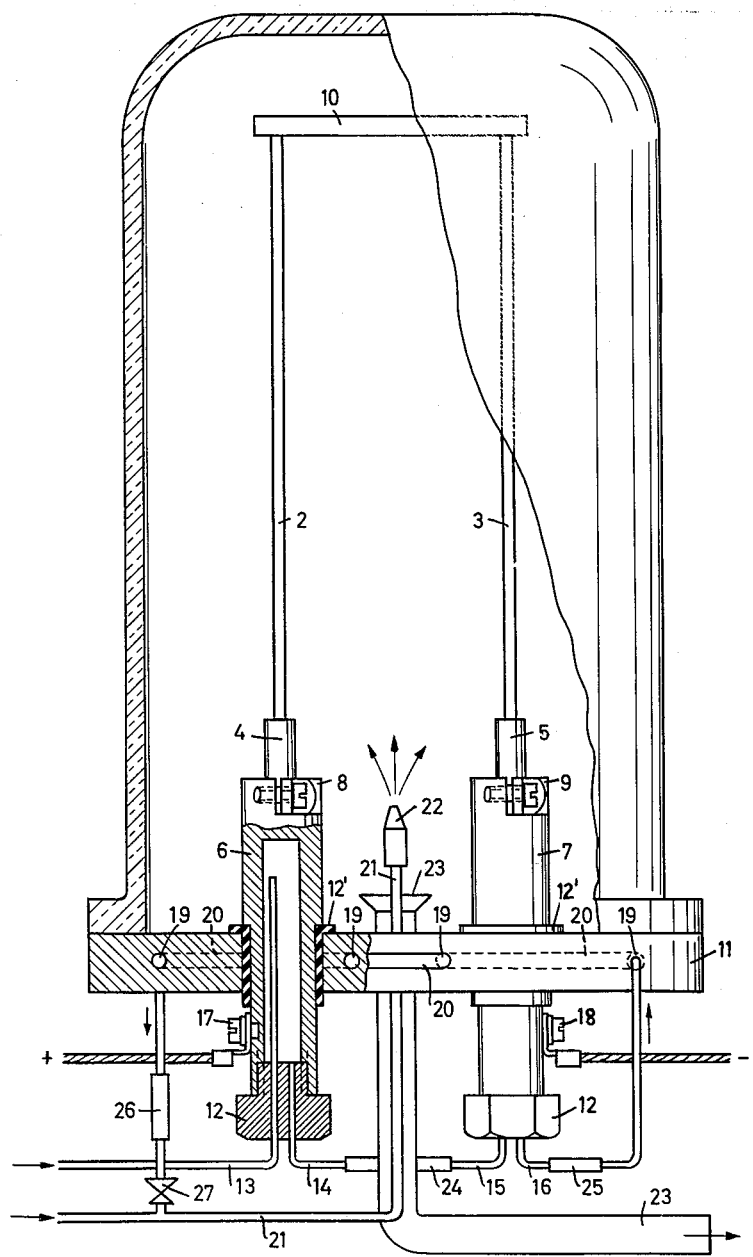

2,999,735
METHOD AND APPARATUS FOR PRODUCING HYPER-PURE SEMICONDUCTOR MATERIAL, PARTICULARLY SILICON
Konrad Reuschel, Pretzfeld, Upper Franconia, Germany, assignor to Siemens-Schuckertwerke Aktiengesellschaft, Berlin-Siemensstadt, Germany, a corporation of Germany
Filed Apr. 20, 1960, Ser. No. 23,524
Claims priority, application Germany June 11, 1959
9 Claims. (Cl. 23—223.5)

My invention relates to a method and apparatus for producing hyper-pure semiconductor material such as silicon for electronic purposes, by precipitating the semiconductor material by chemical conversion from a gaseous compound onto a carrier body of the same semiconductor material while the carrier body is being heated by electric current.

The invention particularly relates to a method and apparatus in which the gaseous compound of the semiconductor substance is admixed with a carrier gas acting as a reducing agent and is confined within a reaction vessel which is closed by a hollow body of metal traversed by a coolant, the current for heating the semiconducting carrier body being supplied through metallic, likewise interiorly cooled holders that are fastened to the enclosing hollow body.

An object of my invention is to improve the efficiency and economy of the precipitating operation. To this end, and in accordance with a feature of my invention, the enclosing hollow body and the parts of the current-supply holders fastened thereupon, are cooled by means of a gaseous coolant during the precipitating operation. Suitable as coolant for this purpose are hydrogen, helium, or steam, for example.

The co-assigned application of Schweikert et al., Serial No. 665,086, filed June 11, 1957, describes a process in which hyper-pure semiconductor material, such as silicon and germanium, but particularly silicon, is produced by precipitating it from the gaseous phase upon solid carrier rods that are directly heated by electric current passing therethrough. The carrier rods are mounted in upright position upon a support, the upper, free ends being in current-conducting connection with each other. The carrier rods consist of the same, extremely pure material as the semiconductor material to be precipitated. The precipitation is effected by decomposition, that is by dissociation and/or reduction of gaseous compounds, for example halogen compounds, which for precipitating silicon are preferably silico-chloroform ($SiHCl_3$) or silicon tetrachloride ($SiCl_4$), mixed with a carrier or reaction gas, such as hydrogen. The precipitation is effected within a reaction vessel comprising, for example, a base plate or base structure and an at least partially transparent bell of glass or quartz vacuum-tightly seated upon the base plate or structure.

During the precipitation process, the carrier rods are heated by direct passage of current to a temperature of about 1200° C. The base plate and the holders for the carrier rods, which preferably consist of a heat-resistant and good heat-conducting metal to provide for better cooling, are preferably subjected to a fluid coolant during the precipitation process in order to prevent precipitation of the silicon at the metal surfaces of the base plate and rod holders. Used for such cooling purpose was water flowing through channels of the base plate and through the rod holders.

Near the surface of the carrier rods there obtains a temperature of about 1100° C., whereas the base plate and rod holders are kept at a temperature of approximately 20° C., due to the cooling by water. This great or excessive temperature gradient causes the production of long chain silicon compounds, which precipitate as a viscous, oily coating upon the rod holders and the base plate of the bell. These tenaciously viscous oils hydrolyze readily and may then form hydrochloric acid when they contact atmospheric humidity, upon opening the bell for the purpose of exchanging the rods. Such coatings also involve the danger of spontaneous ignition. Due to its voluminous surface, the coating tends to hold dust readily, and other impurities, when the bell is open and thus may result in soiling the reaction space. For that reason, each opening of the bell requires cleaning the base plate and the electrodes. The oily precipitation may further lead to clogging of the outlet tube for residual gases. Furthermore, the too intensive cooling of the metal surface in the reaction space constitutes a power loss.

It is a more specific object of my invention to eliminate the above-mentioned shortcomings.

For increasing the cooling action of the gas being used for cooling the base plate and the electrode-type holders of the carrier rods, it is preferable to keep the coolant gas under super-atmospheric pressure of 10 to 20 atmospheres for example.

According to another and preferred feature of my invention, the carrier and reaction gas, for example hydrogen, which is used for the precipitation process, is also employed for cooling the base plate and the rod-holding electrodes. For this purpose it is preferable to pass the hydrogen successively through the rod holders, designed as hollow or tubular bodies for this purpose, and through the base plate which is preferably provided with a number of bores parallel to the plate surface. This results in a considerable saving of electric heating power because the carrier and reaction gas is thus already preheated when it passes into the reaction space. A further saving in power results from the mentioned use of super-atmospheric pressure due to the increase in temperature resulting from the compression of the hydrogen.

According to still another feature of my invention only a portion of the required amount of carrier and reaction gas is used for cooling the base plate and electrode holders. This permits controlling and varying the temperature of the fresh-gas mixture entering into the reaction space, by varying the preheated portion of the gas.

The invention will be further explained in connection with a preferred embodiment illustrated in the accompanying drawing, constituting a front view, party in section.

In the illustrated apparatus two thin silicon rods 2 and 3 are shown, having a diameter of about 3 mm., for example. Such rods are still self-supporting even when they are in glowing condition, for example at 1200° C. The lower ends of the two rods are attached to respective cylindrical intermediate pieces 4 and 5, which preferably consist of hyper-pure graphite or spectral carbon, and which in turn are inserted into rod holders 6 and 7. The upper ends of the rods 2 and 3 are electrically connected with each other by a bridge 10 which may consist of silicon, or may be made by hyper-pure graphite or spectral carbon. The intermediate pieces 4 and 5 have a slightly conical center bore (not shown) into which the end of the silicon rod can be pushed so that the rod will be firmly seated in the intermediate piece. The intermediate pieces are inserted or stuck into the holders 6 and 7 and are fastened by respective clamping sleeves 8 and 9, with the aid of screws. The holders 6 and 7 are preferably made of a sufficiently heat-resistant metal, such as silver. The holders are hollow bodies whose lower openings can be closed by means of screw caps 12. Two tubes 13, 14 or 15, 16 are soldered into each screw cap and serve as inlet and outlet for the cooling medium.

The holders 6 and 7 are further provided with respective terminals 17 and 18 for attaching the electric cables through which the heating current is supplied.

The base plate 11, preferably consisting of silver, has a number of bores 19 which extend parallel to the plate surface, perpendicularly to the plane of the figure, and which communicate with each other through lateral tubes 20 which are soldered to the base plate and are located along their outer periphery. The illustrated apparatus is provided with four bores 19, but the number can be increased if required. The base plate 11 is traversed by an inlet pipe 21 for the gaseous reaction mixture, from which the semiconductor material is to be precipitated upon the electrically heated rods 2, 3. A nozzle 22 for producing a turbulent flow is mounted on the upper end of the inlet pipe 21. The spent reaction gases are exhausted from the reaction space through an outlet 23, also passing through the base plate 11. The gas inflow and outflow directions are indicated by arrows. If desired, pipes 21 and 23 can be concentrically arranged, to provide heat exchange.

The hydrogen used for cooling purposes is supplied through pipe 13 to the rod holder 6. Thence the hydrogen passes through the tube 14, a flexible tubular connection 24, to the tube 15, the rod holder 7, and through another flexible hose connection 25 to the base plate 11 of the reaction vessel. In the base plate the hydrogen passes through the bores 19 and the connecting tubes 20, whereafter the hydrogen is supplied through a flexible hose connection 26 to the left, and then through a reduction valve 27 to the inlet tube 21 for the reaction gas mixture. The flexible hose connections 24, 25 and 26 are preferably made of an electrically insulating, flexible synthetic plastic.

A special advantage of the invention is derived from the fact that the temperature of the base plate and the rod holders can be adjusted and varied within wide limits by correspondingly controlling or regulating the speed of flow of the hydrogen used for cooling. Cooling of the base plate and of the rod holders is required only to such extent that the electric insulation of the seals 12' is not impaired. For that reason the base plate and the rod holders need not be cooled down more than to approximately 300° C.

I claim:

1. In a method of producing semiconductor silicon, in which silicon is precipitated upon an electrically heated carrier body consisting of silicon, by decomposing a gaseous compound of silicon in contact with the carrier body, the carrier body being heated by passing electric current therethrough, the gaseous compound being mixed with hydrogen gas, the process being carried out at a temperature of at least about 1100° C. in a reaction space at least partly enclosed by a heat-conductive structure, the improvement comprising supporting the carrier body in said space in gas sealed and electrically insulated relation with respect to said structure, passing hydrogen under superatmospheric pressure in heating exchange relation with the said structure to cool the latter so as to protect the electrical insulating seal, said cooling being to not lower than about 300° C. so as to disfavor precipitation of an oily, viscous coating of silicon compound upon said structure.

2. In a method of producing semiconductor silicon, in which silicon is precipitated upon an electrically heated carrier body consisting of silicon, by decomposing a gaseous compound of silicon in contact with the carrier body, the carrier body being heated by passing electric current therethrough, the gaseous compound being mixed with hydrogen gas, the process being carried out at a temperature of at least about 1100° C. in a reaction space at least partly enclosed by a heat-conductive structure, the improvement comprising supporting the carrier body in said space in gas sealed and electrically insulated relation with respect to said structure, passing hydrogen under superatmospheric pressure in heating exchange with the said structure to cool the latter so as to protect the electrical insulating seal, said cooling being to not lower than about 300° C. so as to disfavor precipitation of an oily, viscous coating of silicon compound upon said structure, the hydrogen being thus preheated and being thereafter introduced into the reaction space.

3. In a method of producing semiconductor silicon, in which silicon is precipitated upon an electrically heated carrier body consisting of silicon, by decomposing a gaseous compound of silicon in contact with the carrier body, the gaseous compound being mixed with a reducing carrier gas, the process being carried out in a reaction space at least partly enclosed by a heat-conductive structure, the improvement comprising supporting the carrier body in said space in gas sealed and electrically insulated relation with respect to said structure, passing a gas in heating exchange relation with the said structure to cool the latter so as to protect the electrical insulating seal, said cooling being above the temperature at which an oily, viscous coating of silicon compound precipitates, said gas being taken from the group consisting of said gaseous compound and said reducing carrier gas.

4. In a method of producing a semiconductor material, in which said material is precipitated upon an electrically heated carrier body consisting of the same material, by decomposing a gaseous compound of said material in contact with the carrier body, the carrier body being heated by passing electric current therein, the process being carried out in a reaction space at least partly enclosed by a heat-conductive metallic structure, the improvement comprising supporting the carrier body in said space in gas sealed and electrically insulated relation with respect to said structure, passing a gas in heating exchange relation with the said structure to cool the latter to a temperature low enough to protect the electrical insulating seals and high enough to disfavor precipitation of an oily, viscous coating of silicon upon said structure, said gas being taken from the group consisting of said gaseous compound and a reducing carrier gas, the said gas being thereby preheated, and being thereafter introduced into the reaction space.

5. A method for producing hyper-pure semiconductor material, for electronic purposes, comprising precipitating the semiconductor material upon an electrically heated carrier body consisting of the same semiconductor material, from a gaseous compound of said semiconductor material, with the aid of a carrier gas acting as reducing agent, the precipitation being effected within a reaction space at least partly enclosed by a body of metal, cooling said metal body and said metallic holder, by a flow of gaseous coolant, to a temperature low enough to protect the electrical insulating seals and high enough to disfavor precipitation of an oily, viscous coating of silicon upon said metal body and said metallic holder, electric heating current being passed through the carrier body by a heat insulated metallic holder supporting the carrier body.

6. An apparatus for producing semiconductor silicon by deposition of silicon on a silicon body by decomposition of a gaseous compound of silicon in contact with the heated body, comprising an enclosing vessel, said vessel comprising at least in part a metallic enclosing structure means, said structure means having an operatively associated passageway for cooling it, the apparatus further comprising an intake for a gaseous compound of silicon and an outlet for reacted gas, two electrically connected portions of silicon extending within the vessel, a metallic holder means for and supporting each of the portions, said holder means having operatively associated passageways for cooling the holders, electrodes connected to the holder means for passage of electric heating current through the portions, said holder means being supported in gas-sealed and electric-insulated relation with respect to the metallic structure means, conduit means connected for passing a cooling gas through said holder associated passageways and said metallic structure associated passageways.

7. An apparatus for producing semiconductor silicon by deposition of silicon on a hot silicon body by decomposition of a gaseous compound of silicon in contact with the heated body, the decomposition being with the aid of a carrier gas acting as reducing agent, comprising an enclosing vessel, said vessel comprising at least in part a metallic enclosing plate, said plate having a passageway therein for cooling it, the apparatus further comprising intake means for a gaseous compound of silicon and said carrier gas and a gas outlet, two electrically connected portions of silicon extending within the vessel, a metallic holder means for and supporting each of the portions, said holder means being hollow, to provide passageways for cooling the holders, electrodes connected to the holder means for passage of electric heating current through the silicon portions, said holder means being supported in gas-sealed and electric-insulated relation with respect to the metallic structure means, conduit means communicating with said holder passageways and said metallic plate passageway, for introduction of a cooling gas comprising a gas of the group consisting of said carrier gas and gaseous compound, and for passage of the thus preheated gas utlimately into the vessel.

8. The apparatus defined in claim 7, the conduit means being connected to and between the two hollow spaces of the holders for sequential flow of the cooling gas therein, and for flow thereafter to the passage in the enclosing plate.

9. The apparatus defined in claim 7, the hollows of the holders extending externally of the vessel, and each being provided with external removable closure means, the said conduit means being connected to the closure means to communicate with the hollows.

References Cited in the file of this patent

UNITED STATES PATENTS

| 2,763,581 | Freedman | Sept. 18, 1956 |
| 2,904,404 | Ellis | Sept. 15, 1959 |
| 2,912,311 | Mason et al. | Nov. 10, 1959 |

OTHER REFERENCES

Review of Scientific Instruments, vol. 25, No. 4, April 1954, pages 331, 332.